United States Patent
Lee et al.

(10) Patent No.: US 7,649,913 B2
(45) Date of Patent: Jan. 19, 2010

(54) METHOD AND SYSTEM FOR MITIGATING TRAFFIC CONGESTIONS IN A COMMUNICATION NETWORK

(75) Inventors: Junghoon Lee, North Potomac, MD (US); George F. Elmasry, Farmingdale, NJ (US)

(73) Assignee: D&S Consultants, Inc., Eatontown, NJ (US)

( * ) Notice: Subject to any disclaimer, the term of this patent is extended or adjusted under 35 U.S.C. 154(b) by 389 days.

(21) Appl. No.: 11/670,682

(22) Filed: Feb. 2, 2007

(65) Prior Publication Data

US 2008/0095150 A1 Apr. 24, 2008

Related U.S. Application Data

(60) Provisional application No. 60/853,219, filed on Oct. 20, 2006.

(51) Int. Cl.
*H04J 3/00* (2006.01)
*H04J 11/00* (2006.01)
(52) U.S. Cl. ........................ 370/529; 370/392
(58) Field of Classification Search .............. 370/229, 370/235, 389, 392, 535, 537
See application file for complete search history.

(56) References Cited

U.S. PATENT DOCUMENTS

| | | | |
|---|---|---|---|
| 6,721,334 B1 * | 4/2004 | Ketcham | 370/473 |
| 7,027,450 B2 * | 4/2006 | Collette et al. | 370/401 |
| 7,457,316 B1 * | 11/2008 | Durrant et al. | 370/473 |
| 7,489,688 B2 * | 2/2009 | Giesberts et al. | 370/392 |
| 2001/0053149 A1 * | 12/2001 | Mo et al. | 370/389 |
| 2001/0055317 A1 * | 12/2001 | Kajizaki et al. | 370/474 |
| 2002/0101872 A1 * | 8/2002 | Boivie | 370/393 |
| 2002/0105952 A1 * | 8/2002 | Bonomi et al. | 370/394 |
| 2002/0196787 A1 * | 12/2002 | Rajan et al. | 370/393 |
| 2003/0193939 A1 * | 10/2003 | Henrion | 370/389 |
| 2004/0252721 A1 * | 12/2004 | Lingafelt et al. | 370/473 |
| 2005/0220111 A1 * | 10/2005 | Mann et al. | 370/392 |
| 2006/0029099 A1 * | 2/2006 | Jang et al. | 370/473 |
| 2007/0076599 A1 * | 4/2007 | Ayyagari et al. | 370/229 |
| 2008/0095193 A1 * | 4/2008 | Gaedke et al. | 370/473 |
| 2009/0245260 A1 * | 10/2009 | Mohaban et al. | 370/392 |

* cited by examiner

*Primary Examiner*—Chi H. Pham
*Assistant Examiner*—Warner Wong
(74) *Attorney, Agent, or Firm*—Dennis M. Carleton; Fox Rothschild LLP (57) ABSTRACT

A method for mitigating traffic congestions in a communication network uses concatenated data packets to transmit information between terminals, e.g., edge proxies, of the network. Embodiments of the invention are directed to packet communications over military or commercial networks. In one application, the method is implemented in a network using High Assurance Internet Protocol Encryption (HAIPE).

44 Claims, 4 Drawing Sheets

METHOD AND SYSTEM FOR MITIGATING TRAFFIC CONGESTIONS IN A COMMUNICATION NETWORK

CROSS-REFERENCE TO RELATED APPLICATIONS

This application claims benefit of U.S. provisional patent application Ser. No. 60/853,219, filed Oct. 20, 2006, which is herein incorporated by reference.

FIELD OF THE INVENTION

The present invention generally relates to the field of communication networks and, in particular, to a method for mitigating traffic congestions in a communication network.

BACKGROUND OF THE INVENTION

Communication networks may experience traffic congestion events. During such events, performance of data, voice, or video communications degrades and may fall below acceptable levels. In particular, traffic congestions are more likely to occur in military and commercial networks using data encryption techniques.

Figure 1:
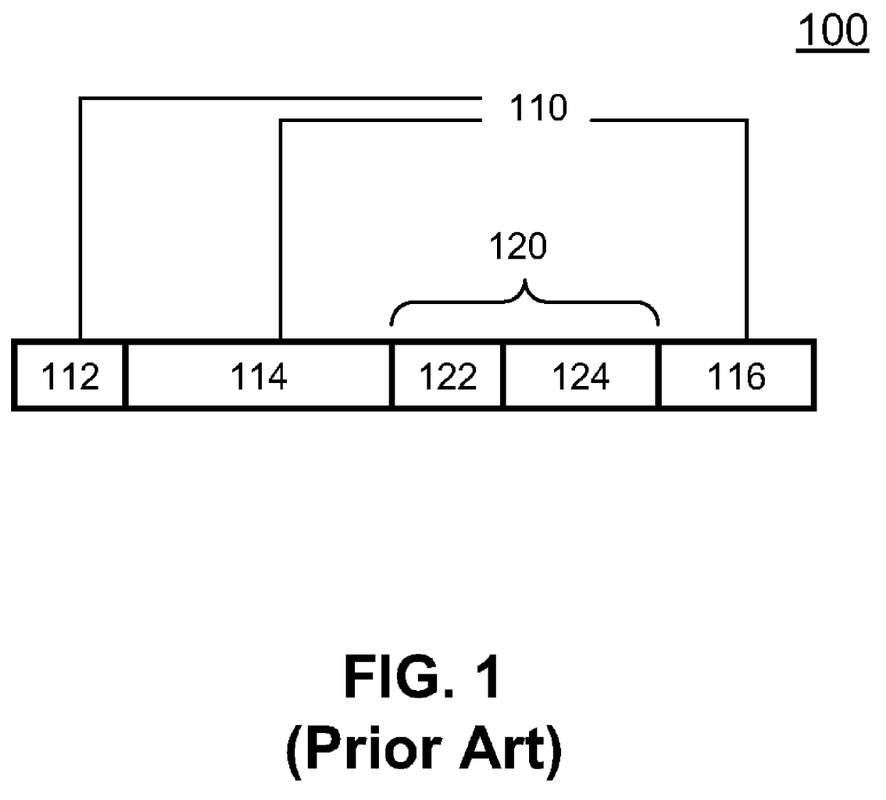
FIG. 1 is a schematic diagram of a conventional datagram for transmitting encrypted information in an IP-based network.

FIG. 1 depicts an exemplary conventional datagram 100 that may be used for transmitting encrypted information in an Internet Protocol (IP) based communication system. The datagram 100 includes an encryption overhead block 110 and a packet 120 having an IP header 122 and a payload 124. The encryption overhead block 110 generally includes an IP header 112, an encryption header 114, and an encryption trailer 116.

Encryption techniques commonly produce large amounts of overhead that significantly increases the traffic load in a network. For example, in the datagram 100, a bit length of the encryption overhead block 110 may exceed by more than two times a bit length of the packet 120. Correspondingly, limited bandwidths of the respective networks may prevent use of effective encryption techniques that tend to generate large overhead traffic.

Therefore, despite the considerable effort in the art devoted to avoidance or mitigation of traffic congestions in communication network, further improvements would be desirable.

SUMMARY OF THE INVENTION

Embodiments of the present invention are generally directed to packet communications over military or commercial communication networks.

One aspect of the invention provides a method for exchanging information using data packets that are concatenated to form integrated datagrams. When transmitted information is encrypted, each integrated datagram includes an encryption protocol-specific overhead block.

Another aspect of the present invention provides a method for transmitting information in an Internet Protocol (IP) based communication network. In one embodiment, the method includes the steps of identifying data packets having a common interim destination terminal, e.g., edge proxy of the network, concatenating such data packets to form one or more integrated datagrams, and exchanging the integrated datagrams between transmitting and receiving terminals of the network.

Yet another aspect of the present invention provides a method for mitigating traffic congestion in a communication network having at least two edge proxies and using High Assurance Internet Protocol Encryption (HAIPE). In one embodiment, the method includes the steps of generating data packets having a header and a payload containing a portion of the information. The data packets are concatenated to form integrated datagrams, each such datagram having an encryption protocol-specific overhead block. The integrated datagrams are exchanged between transmitting and receiving edge proxies of the network. A number of the data packets in an integrated datagram is dynamically defined based on assessment of a plurality of pre-determined parameters, including a traffic load, a type of a content of the concatenated data packets, probability of a loss of the data packets, and a Differentiated Services Code Point (DSCP) value.

Still another aspect of the present invention is a communication network using the inventive method.

Various other aspects and embodiments of the invention are described in further detail below.

The Summary is neither intended nor should it be construed as being representative of the full extent and scope of the present invention, which these and additional aspects will become more readily apparent from the detailed description, particularly when taken together with the appended drawings.

BRIEF DESCRIPTION OF THE DRAWINGS

To facilitate understanding, identical reference numerals have been used, where possible, to designate identical elements that are common to the figures. The images in the drawings are simplified for illustrative purposes and are not depicted to scale.

The appended drawings illustrate exemplary embodiments of the invention and, as such, should not be considered as limiting the scope of the invention that may admit to other equally effective embodiments. It is contemplated that features or steps of one embodiment may beneficially be incorporated in other embodiments without further recitation.

DETAILED DESCRIPTION

Figure 2:
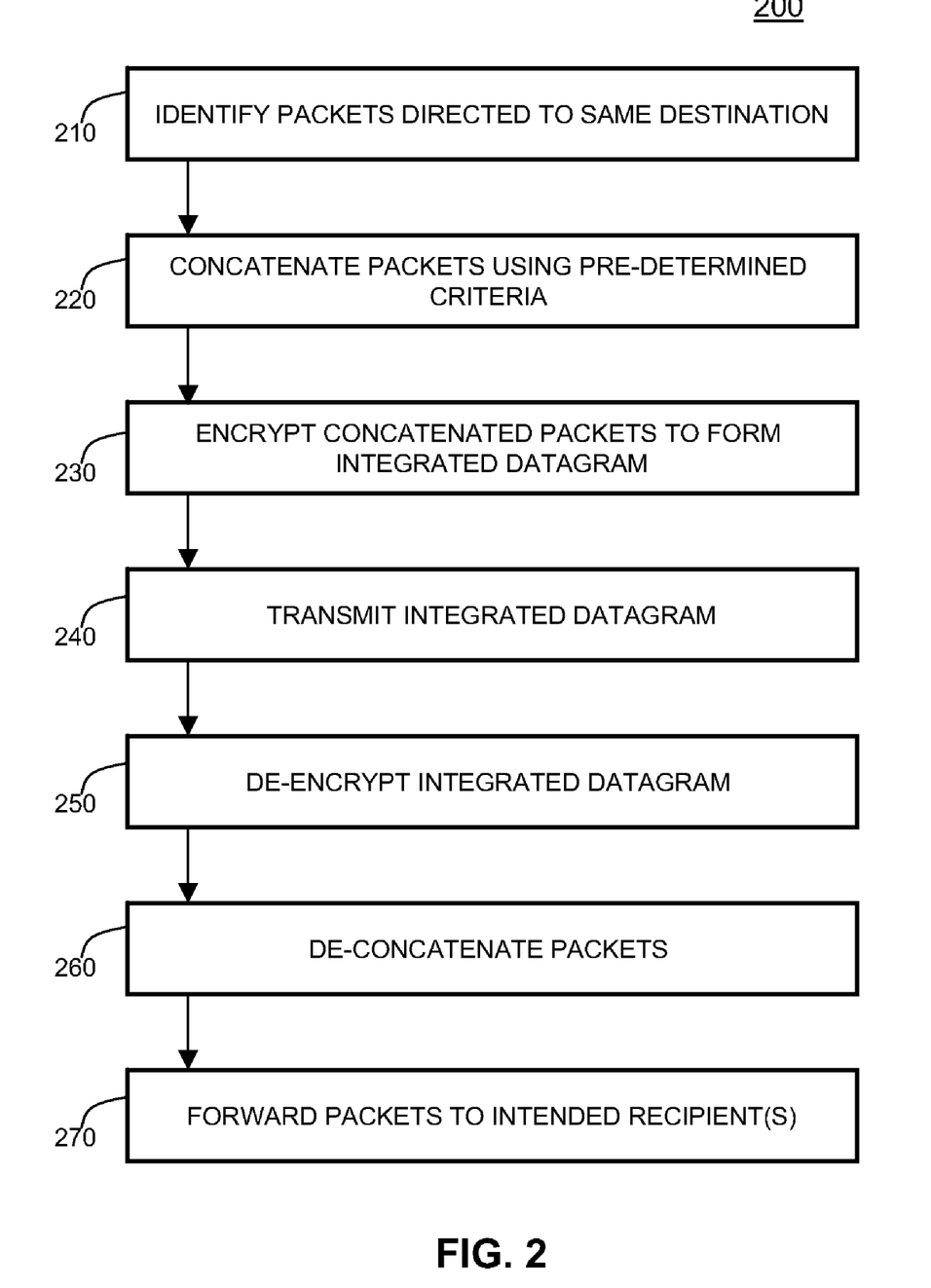
FIG. 2 is a flow diagram illustrating a method of mitigating traffic congestions in a communication network in accordance with one embodiment of the present invention.
Figure 3:
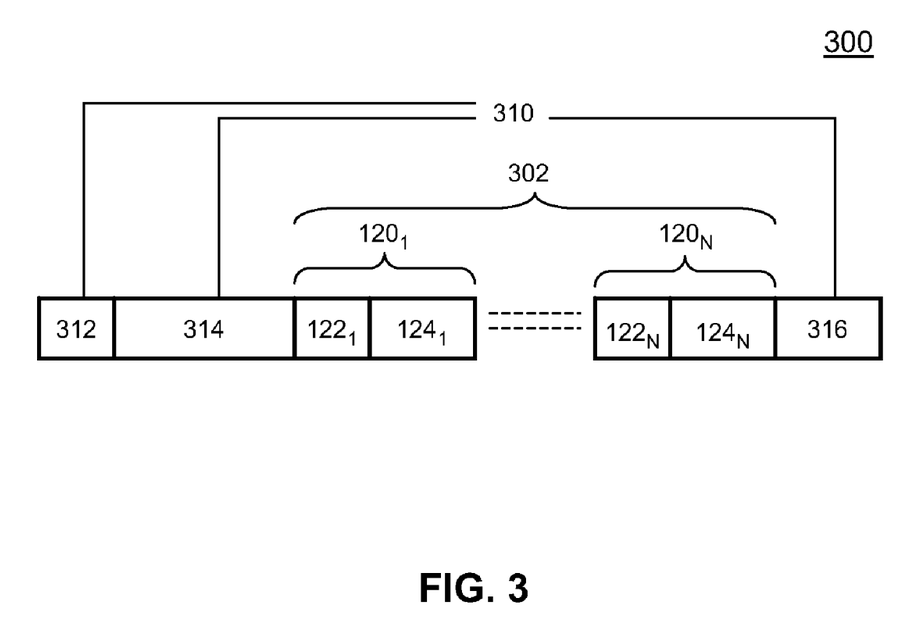
FIG. 3 is a schematic diagram of an integrated datagram formed in accordance with the method of FIG. 2.

Referring to the figures, FIG. 2 depicts a flow diagram illustrating a method 200 of mitigating traffic congestions in a communication network in accordance with one embodiment of the present invention, and FIG. 3 depicts a schematic diagram of an integrated datagram 300 formed in accordance with the method 200. To best understand the invention, the reader is suggested to refer to FIGS. 2-3 simultaneously.

In various embodiments, method steps of the method 200 are performed in the depicted order or at least two of these steps or portions thereof may be performed contemporaneously, in parallel, or in a different order. For example, portions of steps 220 and 230 or steps 260 and 270 may be performed contemporaneously or in parallel. Those skilled in the art will readily appreciate that the order of executing at least a portion of other discussed below processes or routines may also be modified.

Hereafter, aspects of the present invention are illustratively described within the context of IP-based communication networks and, in particular communication networks where information (for example, voice, video, or alphanumerical data) is transmitted in an encrypted format. These networks may comprise wireless, wired, or fiber-optic communication links. It has been contemplated and is within the scope of the present invention that the method 200 may also be utilized within the context of other types of communication networks that are adapted for exchanging digitized information.

At step 210, data packets 120 (shown in FIG. 3) addressed to the same interim destination, i.e., same receiving terminal, are identified and accumulated at a transmitting terminal of a communication network. In one embodiment, the transmitting and receiving terminals are edge proxies of the respective network. Each edge proxy may further be coupled to a plurality of client devices or one or more local area networks (LANs).

Referring to FIG. 3, each data packet 120 includes the IP header 122 and payload 124. The payload 124 may contain digitized voice, alphanumerical data, or video information. Collectively, such information is referred to herein as "data."

At step 220, at least two data packets 120, which are addressed to the same receiving terminal, are concatenated to form a data block 302 (shown in FIG. 3). A number N of the concatenated data packets $120_1$-$120N$ is determined based on pre-determined traffic conditions and, in some embodiments, is determined substantially in a real time, or dynamically.

For example, the number of the concatenated data packets $120_1$-$120_N$ in the data block 302 may be determined based on settings for at least one parameter characterizing: (i) traffic load in a transmission path between the transmitting and receiving terminals, (ii) type of a content of the payloads 124, i.e., voice, alphanumerical data, or video content, (iii) level of precedence of the data packets 120, and (iv) a Quality of Service (QoS) benchmark.

Applicable attributes of the QoS benchmark include packet delay, packet loss ratio, short and long term jitters, packet retransmission ratio, and the like. A degree of compliance with particular QoS requirements may be assessed using parameters $P_E$, $P_C$, and $P_V$ corresponding, respectively, to portions of packet transmissions that exceed, conform to, or violate pre-determined quality thresholds. Typically, the parameters $P_E$, $P_C$, and $P_V$ are expressed in percents, and $P_E+P_C+P_V=100\%$.

Alternatively, or additionally, in some networks (for example, tactical military networks), the number and type of the concatenated packets 120 is based on a Differentiated Services Code Point (DSCP) value $V_{DSCP}$ of these packets. Typically, the DSCP value is selectively assigned to the data packets 120 in accordance with a level of precedence of their payloads 124. Correspondingly, the data block 302 is assigned a level of precedence that is equal to a highest such level among the component data packets 120 of the data block.

At step 230, contents of the payloads 124 of the concatenated data packets $120_1$-$120_N$ of the data block 302 are encrypted using a respective encryption protocol. In some embodiments, the contents are encrypted using High Assurance Internet Protocol Encryption (HAIPE) or an IP Security (IPSec) protocol, among other encryption protocols.

Data encryption generates an overhead block 310 including a header 312 (for example, IP header) and at least one of an encryption protocol-specific header 314 or an encryption protocol-specific trailer 316. Together, the data block 302 and the encryption overhead block 310 form an integrated datagram 300.

It should be noted that, in the method 100, only one overhead block 310 is needed for transmitting a plurality on N data packets 120 encoded in compliance with a respective encryption protocol. Typically, the integrated datagram 300 is assigned a level of precedence that is equal to the highest one among the component data packets 120 of the data block 302. In some embodiments, when data encryption is not used, the overhead block 310 comprises only the header 312.

At step 240, the integrated datagram 300 is transmitted from a transmitting terminal to a receiving terminal of the network 400 (see FIG. 4) at the interim destination of the concatenated data packets 120. For example, in the depicted embodiment, the integrated datagram 300 is illustratively transmitted from an edge proxy $424_A$ to an edge proxy $424_B$ (see FIG. 4).

At step 250, at the receiving terminal of the network, the integrated datagram 300 is de-encrypted, and the data block 302 is separated from the encryption overhead block 310.

At step 260, the data block 302 is de-concatenated, i.e., the data packets $120_1$-$120_N$ are separated from one another.

Figure 4:
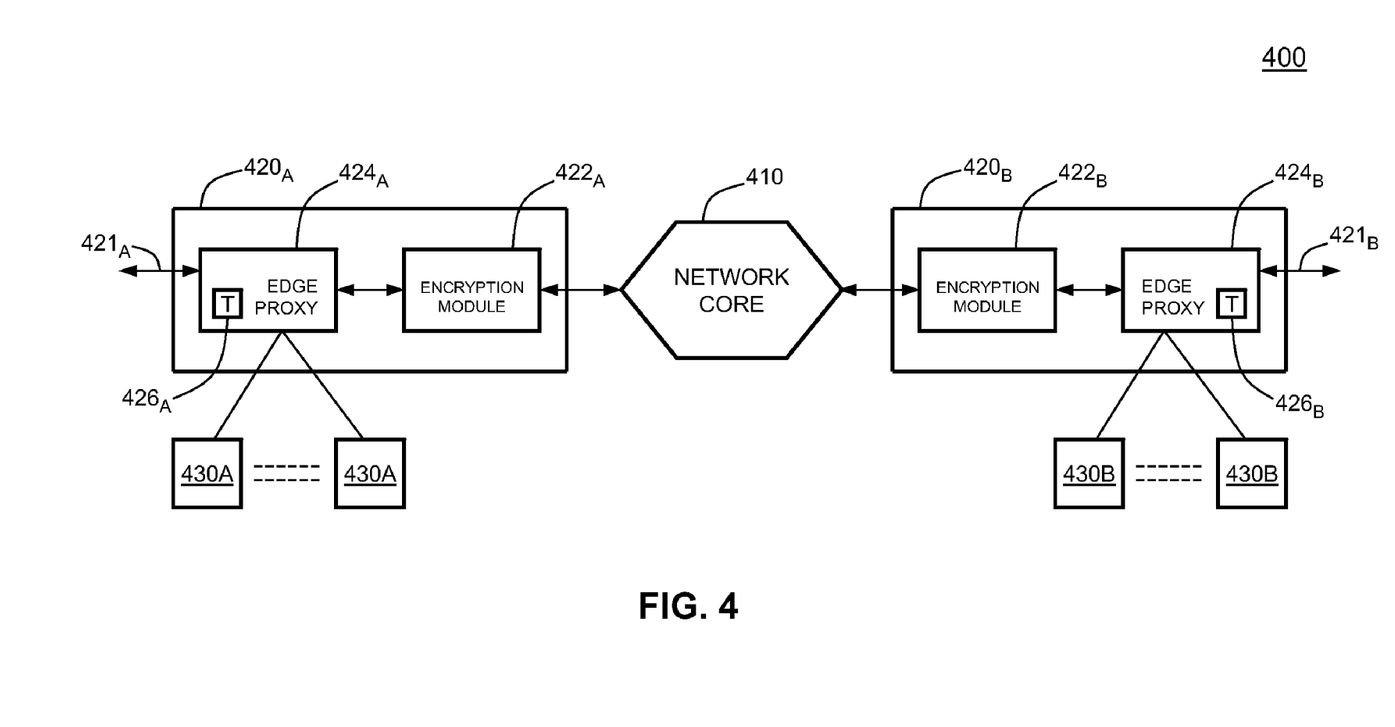
FIG. 4 is a high-level, schematic diagram of an exemplary communication network using the method of FIG. 2.

At step 270, the data packets $120_1$-$120_N$ are forwarded to their respective recipient(s), i.e., one or more client devices coupled to the receiving terminal (for example, the edge proxy $424_B$) of the network.

FIG. 4 is a high-level, schematic diagram of an exemplary communication network 400 using the method 100 of FIG. 2. Illustratively, the network 400 comprises a network core 410 and a plurality of network edges 420 (network edges 420A and 420B are shown).

In the depicted embodiment, each network edge 420 includes an encryption module 422 and an edge proxy 424 coupled to respective client devices 430. The encryption module 422 may be realized as a software module, a hardware device, or a combination thereof. In some embodiments, the encryption module 422 is a portion of the edge proxy 424. The client devices 430 may be connected to the edge proxy 424 directly (as shown) or via a local area network (LAN).

In operation, using interfaces 421, the edge proxies 424 exchange packetized messages between each other or with external networks (not shown). When these messages are transferred within the network 400, i.e., between the network edges 420, to mitigate traffic congestion in a transmission path between the respective network edges, such messages may be transmitted as one or more integrated datagrams 300 (discussed above in reference to FIGS. 2-3).

In one embodiment, the edge proxy 424 comprises a timer 426 (denoted in FIG. 4 as "T") that may be used for determining the number N of concatenated data packets 120 of the integrated datagram 300. Settings of the timer 426 correspond to time intervals allocated for identifying, selecting, or concatenating the data packets 120 for a particular integrated datagram 300. Duration of such time intervals is generally based on the content of the payloads and a traffic conditions in the transmission path between the transmitting and receiving edge proxies.

As traffic congestion increases, more data packets 120 are concatenated in the data block 302 and, as such, a bit length of the integrated datagram 300 increases to mitigate the traffic load in the network 400. Nominal values of the settings for the timer 426 depend on severity of the experienced traffic congestions and typically are in a range from about 1 to 100 msec. In one embodiment, the timer 426 is assigned settings M1-M6 that are summarized in Table 1 below, wherein M2>M1, M4>M3, and M6>M5.

TABLE 1

| SETTING OF EDGE PROXY TIMER | PACKET PAYLOAD CONTENT | LEVEL OF TRAFFIC CONGESTION |
|---|---|---|
| M1 | Voice | Low |
| M2 | Voice | High |
| M3 | Data | Low |
| M4 | Data | High |
| M5 | Video | Low |
| M6 | Video | High |

In a further embodiment, alternatively or additionally, particular types of data packets 120 are concatenated based on severity of the traffic conditions, values of components $P_C$ and $P_V$ of the QoS benchmark, and the DSCP value $V_{DSCP}$ of the data packets 120, as summarized below in Table 2. For purpose of brevity, the terms "Voice packets," "Data packets," and "Video packets" are used in the Table 2 in reference to the content of the payloads 124 of the respective data packets 120.

TABLE 2

| Traffic Conditions | Level of Congestion | Structure of Payload of Integrated Datagram |
|---|---|---|
| $P_C + P_V > P_1$ | 1 | Voice packets having the same DSCP value<br>Edge proxy timer setting is M1 |
| $P_C + P_V > P_2$ | 2 | Voice packets regardless of DSCP value<br>Edge proxy timer setting is M2 |
| $P_C + P_V > P_3$ | 3 | Video & data packets with same DSCP value<br>Edge proxy timer is M3 for data packets and M5 for video packets |
| $P_C + P_V > P_4$ | 4 | Voice & data packets regardless of DSCP value<br>Edge proxy timer is M4 for data packets and M6 for video packets |
| $P_C + P_V > P_5$ | 5 | Voice, data, & video packets regardless of DSCP value |

In yet another embodiment, alternatively or additionally, particular types of the data packets 120 are concatenated based on admission control requirements in the network 400. Some networks (for example, military networks), in attempt to assure delivery of messages having higher levels of precedence LP, may tolerate delays in delivery of less important messages, or, occasionally, even a loss of such messages. In this embodiment, at any given time, the integrated diagrams 300 are formed using the data packets 120 that are in compliance with particular admission rules. Exemplary admission rules are summarized in Table 3, wherein $LP_1 < LP_2$, $P_{V1}$ and $P_{V2}$ are pre-determined constants, and $P_{V2} > P_{V1}$:

TABLE 3

| Traffic Conditions | Structure of Integrated Datagram |
|---|---|
| $P_V > P_{V1}$ | Data packets having precedence LP ≧ LP1<br>Data packets having precedence LP < LP1 are delayed or dropped |
| $P_V > P_{V2}$ | Data packets having precedence LP ≧ LP2<br>Data packets having precedence LP < LP2 are delayed or dropped |

Although the invention herein has been described with reference to particular illustrative embodiments, it is to be understood that these embodiments are merely illustrative of the principles and applications of the present invention. Therefore numerous modifications may be made to the illustrative embodiments and other arrangements may be devised without departing from the spirit and scope of the present invention, which is defined by the appended claims.

What is claimed is:

1. A method of exchanging information, comprising the steps of:
   (a) identifying data packets having a common interim destination, each data packet including a header and a payload;
   (b) selecting two or more of said identified data packets, said data packets being selected based upon one or more criteria, during a pre-determined period of time;
   (c) concatenating said selected data packets to form an integrated datagram;
   (d) assigning to the integrated datagram a level of precedence equal to a highest level of precedence among the concatenated data packets; and
   (e) exchanging the information using at least one integrated datagram.

2. The method of claim 1, wherein said pre-determined period of time is also set based upon said one or more criteria.

3. The method of claim 2, wherein said one or more criteria are selected from a group consisting of:
   the current level of traffic congestion;
   the type of data contained in the payloads of said identified data packets;
   a Quality of Service (QoS) benchmark component;
   a Differentiated Services Code Point (DSCP) value; and
   a minimum level of precedence required for network admission.

4. A method of exchanging information comprising the steps of:
   (a) identifying data packets having a common destination, each data packet including a header and a payload;
   (b) concatenating data packets to form an integrated datagram;
   (c) exchanging the information using at least one integrated datagram; and
   (d) assigning to the integrated datagram a level of precedence equal to a highest level of precedence among the concatenated data packets.

5. The method of claim 1, wherein step (e) further comprises exchanging the information using an Internet Protocol (IP) based wireless, wired, or fiber-optic communication network.

6. The method of claim 1, wherein step (c) further comprises:
   encrypting the data packets; and
   including in the integrated datagram an encryption protocol-specific overhead block.

7. The method of claim 1, wherein step (e) further comprises separating payloads of the concatenated datagrams in a received integrated datagram.

8. A method of transmitting information in an Internet Protocol (IP) based communication network, comprising:
   at a transmitting terminal of the network:
      (a) identifying data packets having a common interim destination, each data packet including a header and a payload;
      (b) selecting two or more of said identified data packets, said selection being based upon one or more criteria, during a pre-determined period of time;
      (c) concatenating said selected data packets to form an integrated datagram;

(d) assigning to the integrated datagram a level of precedence equal to a highest level of precedence among the concatenated data packets;
(e) transmitting the integrated datagram; and
(f) repeating the steps (a)-(e) until the information is transmitted; and at a receiving terminal of the network:
(g) separating concatenated data packets in a received integrated datagram; and
(h) selectively forwarding the separated data packets to intended recipients.

9. The method of claim 8, wherein said pre-determined period of time is also set based upon said one or more criteria.

10. The method of claim 8, wherein the network is a wireless, wired, or fiber-optic communication network.

11. The method of claim 8, wherein the network is in compliance with at least one data encryption protocol.

12. The method of claim 8, wherein at least one of the transmitting and receiving terminals is an edge proxy of the network.

13. The method of claim 8, wherein the step (c) further comprises:
   encrypting the concatenated data packets; and
   including an encryption protocol-specific overhead block in said integrated datagram.

14. The method of claim 13, further comprising encrypting the concatenated data packets in compliance with High Assurance Internet Protocol Encryption (HAIPE) or an IP Security (IPSec) protocol.

15. The method of claim 9, wherein said one or more criteria are selected from a group consisting of:
   the current level of traffic congestion;
   the type of data contained in the payloads of said identified data packets;
   a Quality of Service (QoS) benchmark component;
   a Differentiated services Code Point (DSCP) value; and
   a minimum level of precedence required for network admission.

16. The method of claim 15, further comprising determining the number and type of the concatenated data packets in the integrated datagram substantially in real time.

17. The method of claim 8, wherein step (c) further comprises selecting said data packets having a pre-determined level of precedence.

18. A method of transmitting information in an Internet Protocol (IP) based communication network, comprising:
   at a transmitting terminal of the network:
   (a) identifying data packets having a common interim destination, each data packet including a header and a payload;
   (b) concatenating data packets to form an integrated datagram;
   (c) assigning to the integrated datagram a level of precedence equal to a highest level of precedence among the concatenated data packets;
   (d) transmitting the integrated datagram;
   (e) repeating the steps (a)-(d) until the information is transmitted; and at a receiving terminal of the network:
   (f) separating concatenated data packets in a received integrated datagram; and
   (g) selectively forwarding the separated data packets to intended recipients.

19. The method of claim 8, wherein the step (g) further comprises de-encrypting said data packets.

20. A method for mitigating traffic congestions in a wireless communication network having at least two edge proxies and using High Assurance Internet Protocol Encryption (HAIPE), the method comprising the steps of:
   at a transmitting edge proxy:
   (a) identifying data packets having a common interim destination, each data packet including a header and a payload;
   (b) selecting two or more of said identified data packets, said data packets being selected based upon one or more criteria, during a pre-determined period of time;
   (c) concatenating said selected data packets;
   (d) encrypting the concatenated data packets using HAIPE;
   (e) forming an integrated datagram including the encrypted concatenated data packets and an encryption protocol-specific overhead block;
   (f) assigning to the integrated datagram a level of precedence equal to a highest level of precedence among the concatenated data packets;
   (g) transmitting the integrated datagram; and
   (h) repeating the steps (a)-(f); and
   at a receiving edge proxy:
   (i) separating concatenated data packets in received integrated datagrams; and
   (j) selectively forwarding the separated data packets to recipients of the information.

21. The method of claim 20, wherein said pre-determined period of time is also set based upon said one or more criteria.

22. The method of claim 21, wherein said one or more criteria are selected from a group consisting of:
   a traffic load in a transmission path between the transmitting and receiving edge proxies;
   the type of data contained in the payloads of said identified data packets;
   a Quality of Service (QoS) benchmark component;
   a Differentiated Services Code Point (DSCP) value; and
   a minimum level of precedence required for network admission.

23. The method of claim 21, further comprising determining the number and type of the concatenated data packets in the integrated datagram substantially in real time.

24. The method of claim 20, wherein said selected data packets have a pre-determined level of precedence.

25. A method for mitigating traffic congestions in a wireless communication network having at least two edge proxies and using High Assurance Internet Protocol Encryption (HAIPE), the method comprising the steps of:
   at a transmitting edge proxy:
   (a) identifying data packets having a common interim destination, each data packet including a header and a payload;
   (b) concatenating said selected data packets;
   (c) encrypting the concatenated data packets using HAIPE;
   (d) forming an integrated datagram including the encrypted concatenated data packets and an encryption protocol-specific overhead block;
   (e) assigning to said integrated datagram a level of precedence equal to a highest level of precedence among the concatenated data packets;
   (f) transmitting the integrated datagram; and
   (g) repeating the steps (a)-(f); and
   at a receiving edge proxy:
   (h) separating concatenated data packets in received integrated datagrams; and
   (i) selectively forwarding the separated data packets to recipients of the information.

26. The method of claim 20, wherein step (i) further comprises de-encrypting the data packets.

27. A computer readable medium storing software that, when executed, causes a communication network to perform a method of exchanging information, comprising:
 (a) identifying data packets having a common interim destination, each data packet including a header and a data payload;
 (b) selecting two or more of said identified data packets, said selection being based upon one or more criteria, during a pre-determined period of time;
 (c) concatenating said selected data packets to form an integrated datagram;
 (d) assigning to the integrated datagram a level of precedence equal to a highest level of precedence among the concatenated data packets; and
 (e) exchanging the information using at least one of said integrated datagrams.

28. The computer readable medium of claim 27, wherein step (c) further comprises:
 encrypting said concatenated data packets; and
 including in the integrated datagram an encryption protocol-specific overhead block.

29. A computer readable medium storing software that, when executed, causes a communication network to perform a method of transmitting information, comprising:
 at a transmitting terminal of the network:
  (a) identifying data packets having a common interim destination, each data packet including a header and a payload containing at least a portion of the information;
  (b) selecting two or more of said identified data packets, said selection being based upon one or more criteria, during a pre-determined period of time;
  (c) concatenating said selected data packets to form an integrated datagram;
  (d) assigning to the integrated datagram a level of precedence equal to a highest level of precedence among the concatenated data packets;
  (e) transmitting said integrated datagram; and
  (f) repeating the steps (a)-(e) until said information is transmitted; and
 at a receiving terminal of the network:
  (g) separating concatenated data packets in a received integrated datagram; and
  (h) selectively forwarding said separated data packets to intended recipients.

30. The computer readable medium of claim 29, wherein said pre-determined period of time is also set based upon said one or more criteria.

31. The computer readable medium of claim 29, wherein at least one of the transmitting and receiving terminals is an edge proxy of the network.

32. The computer readable medium of claim 29, wherein step (c) further comprises:
 encrypting said concatenated data packets; and
 including in the integrated datagram an encryption protocol-specific overhead block.

33. The computer readable medium of claim 29, wherein step (g) further comprises de-encrypting said data packets.

34. The computer readable medium of claim 30, wherein said one or more criteria are selected from a group consisting of:
 a traffic load in a transmission path between the transmitting and receiving terminals;
 the type of data contained in the payloads of the identified data packets;
 a Quality of Service (QoS) benchmark component;
 a Differentiated Services Code Point (DSCP) value; and
 a minimum level of precedence required for network admission.

35. The computer readable medium of claim 29, wherein step (b) further comprises selecting data packets having a pre-determined level of precedence.

36. A computer readable medium storing software that, when executed, causes a communication network to perform a method of transmitting information, comprising:
 at a transmitting terminal of the network:
  (a) identifying data packets having a common interim destination, each data packet including a header and a payload;
  (b) concatenating said selected data packets to form an integrated datagram;
  (c) assigning to the integrated datagram a level of precedence equal to a highest level of precedence among the concatenated data packets;
  (d) transmitting said integrated datagram; and
  (e) repeating the steps (a)-(d) until said information is transmitted; and
 at a receiving terminal of the network:
  (f) separating concatenated data packets in a received integrated datagram; and
  (g) selectively forwarding said separated data packets to intended recipients.

37. An Internet Protocol (IP) based communication network, comprising:
 a network core; and
 at least two network edge proxies, each edge proxy adapted for:
  (a) identifying data packets having a common interim destination, each data packet including a header and a payload;
  (b) selecting two or more of said identified data packets, said selection being based upon one or more criteria, during a pre-determined period of time;
  (c) concatenating said selected data packets;
  (d) encrypting said concatenated data packets using a pre-determined encryption protocol;
  (e) forming an integrated datagram including said encrypted concatenated data packets and an encryption protocol-specific overhead block;
  (f) assigning to the integrated datagram a level of precedence equal to a highest level of precedence among the concatenated data packets;
  (g) transmitting said integrated datagram;
  (h) repeating the steps (a)-(f);
  (i) separating concatenated data packets in received integrated datagrams; and
  (j) selectively forwarding said separated data packets to recipients of the information.

38. The network of claim 37, wherein said pre-determined encryption protocol is High Assurance Internet Protocol Encryption (HAIPE) or an IP Security (IPSec) protocol.

39. The network of claim 37, wherein said pre-determined period of time is also set based upon said one or more criteria.

40. The method of claim 1 wherein step (e) partially comprises the step of transmitting said integrated datagram at earlier of the end of said pre-determined period of time or when said integrated datagram has reached a pre-determined maximum size.

41. The method of claim 8 wherein, in step (e), said integrated datagram is transmitted at the earlier of the end of said pre-determined period of time or when said integrated datagram has reached a pre-determined maximum size.

42. The method of claim 20 wherein, in step (g), said integrated datagram is transmitted at the earlier of the end of said pre-determined period of time or when said integrated datagram has reached a pre-determined maximum size.

43. The method of claim 27 wherein step (e) partially comprises the step of transmitting said integrated datagram at earlier of the end of said pre-determined period of time or when said integrated datagram has reached a pre-determined maximum size.

44. The method of claim 37 wherein, in step (g), said integrated datagram is transmitted at the earlier of the end of said pre-determined period of time or when said integrated datagram has reached a pre-determined maximum size.

* * * * *